US009047771B1

(12) United States Patent
Thoreen et al.

(10) Patent No.: US 9,047,771 B1
(45) Date of Patent: Jun. 2, 2015

(54) SYSTEMS AND METHODS FOR GROUND COLLISION AVOIDANCE

(71) Applicant: The Boeing Company, Chicago, IL (US)

(72) Inventors: Adam M. Thoreen, Lake Stevens, WA (US); Joshua J. Baer, Shoreline, WA (US); Peter N. Wyckoff, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/200,650

(22) Filed: Mar. 7, 2014

(51) Int. Cl.
*G08G 1/16* (2006.01)
*G08G 5/04* (2006.01)

(52) U.S. Cl.
CPC ........................................ *G08G 5/04* (2013.01)

(58) Field of Classification Search
CPC .............. G01C 23/00; G06F 17/30247; G06F 17/30259; G06D 9/3241; G06K 9/78
USPC ................. 701/3, 14, 301; 340/945; 382/305; 244/50
See application file for complete search history.

(56) References Cited

U.S. PATENT DOCUMENTS

| 6,405,975 | B1 | 6/2002 | Sankrithi et al. |
| 6,928,363 | B2* | 8/2005 | Sankrithi ....................... 701/120 |
| 7,024,309 | B2* | 4/2006 | Doane ........................... 701/301 |
| 7,321,813 | B2* | 1/2008 | Meunier ......................... 701/10 |
| 2004/0059497 | A1* | 3/2004 | Sankrithi ....................... 701/120 |
| 2005/0055143 | A1* | 3/2005 | Doane ............................ 701/30 |
| 2013/0110323 | A1* | 5/2013 | Knight ............................. 701/3 |
| 2014/0142838 | A1* | 5/2014 | Durand ......................... 701/301 |

* cited by examiner

*Primary Examiner* — McDieunel Marc
(74) *Attorney, Agent, or Firm* — Ostrager Chong Flaherty & Broitman P.C.

(57) ABSTRACT

A system for displaying guidance aids to a crew for ground obstacle avoidance, particularly wingtip clearance. Perspective areas are drawn representing the current locations of the wingtips over the ground and predicted locations out into the future for a specified time or a specified distance. A flight crew may use these displayed guidance aids to determine the proximity of any perceived threat to the airplane. This capability addresses the costly problem of wingtip/airplane ground collisions. The graphical cue systems are specifically targeted toward aircraft that have a large wing span/size and/or folding wingtips.

24 Claims, 12 Drawing Sheets

SYSTEMS AND METHODS FOR GROUND COLLISION AVOIDANCE

BACKGROUND

This disclosure generally relates to systems and methods for avoiding collisions during ground maneuvering by an aircraft.

As airplanes get larger, the distance between the main landing gear and nose landing gear (i.e., wheelbase and distance between each main landing gear (track)) becomes greater. As a result, turning maneuvers require more space. Because most airports were constructed to handle smaller, more maneuverable airplanes with shorter wheelbases and tracks, large airplane maneuvering becomes even more difficult. The restricted widths of the runways and taxiways, coupled with greater airport congestion, have made it progressively more difficult for pilots of large commercial airplanes to make tight maneuvers. Maneuvering large airplanes is difficult because of a lack of feedback to the pilots about relative positioning of the landing gear on the ground. The lack of feedback occurs because an airplane's landing gears are located beneath the fuselage or wings. Accurate knowledge of the location of landing gear, specifically the tires and wheels of the landing gear, is particularly important when maneuvering in tight spaces at crowded airports. A pilot's ability to see runway and taxiway edges, ground service vehicles and potential obstructions is also very limited in large airplanes. Large airplanes with long wheel bases and wide main gear track also face challenges in other types of ground maneuvers such as gate entry maneuvers and runway or turnpad U-turn maneuvers.

In the aviation industry today, the number of dollars lost to damage due to ground collision is significant. Not only do airlines have to repair the damage on one or more aircraft, they need to compensate passengers for schedule disruption, fly in other airplanes, and have their airplane out of service while the damage is repaired. These are costly events. Airport traffic levels are predicted to increase at a rate faster than airports are predicted to grow. Furthermore, the production of larger aircraft, including aircraft with a folding wingtip system, may present significant challenges for the future airport operating environment.

Existing solutions include a pilot's own visual judgment, a ground maneuvering camera system mounted on the aircraft, or dedicated wing walkers shepherding the airplane out of the gate/terminal.

In many instances a pilot relies on only his/her spatial judgment when attempting to navigate aircraft throughout an airport environment. Pilots are trained to maintain the centerline of taxiways, which should provide clearance, but is not guaranteed if there are other obstacles present. Some airplanes do not offer visibility of the wingtips from the vantage point of the flight deck. Low-visibility situations complicate this judgment task.

In other instances some airports provide airport personnel called wing-walkers to help guide the aircraft with assurance that there are no threatening obstacles to the wings. However, wing-walkers are not always available and certainly are not available all the way between the active runway and the ramp area.

Many aircraft today have an external camera system that is designed to aid the pilot in ground maneuvering operations. There are two primary functions for this type of system: help the pilot maintain the gear of the aircraft on the pavement and obstacle collision avoidance. An external camera system may show views of the wingtips, which allows pilots to monitor the position of each wingtip relative to obstacles within close proximity to mitigate wingtip collisions in either folded or extended positions. However, there may be a problem of perspective depending on where the camera is situated. More specifically, if a camera is installed on the empennage section of the aircraft and shows views of the wingtip, a significant off-axis distance exists between the two and makes it very difficult to judge the position of the wingtip relative to the ground or any obstacles in the vicinity of the wingtip.

Improved means and methods for providing guidance aids to a pilot for ground obstacle avoidance, particularly wingtip clearance, are wanted.

SUMMARY

The subject matter disclosed in detail below includes systems for displaying guidance aids to a flight crew for ground obstacle avoidance, particularly wingtip clearance. These systems utilize a ground maneuvering camera system to portray guidance and stay out regions on the displayed image to help pilots easily determine their proximity to potential threats before the incidents occur. In accordance with some embodiments, perspective areas are drawn representing the current locations of the wingtips over the ground and predicted locations out into the future for a specified time or a specified distance. A flight crew may use these displayed guidance aids to determine the proximity of any perceived threat to the airplane. This capability addresses the costly problem of wingtip/airplane ground collisions.

The guidance aid systems disclosed herein are intuitive, flexible, easy to implement and/or modify, and smart (i.e., adaptable). In particular, the disclosed systems preserve pilot understanding on how ground clearance operates. These systems are specifically targeted toward aircraft that have a large wing span/size and/or folding wingtips. However, the graphical guidance aid technology disclosed herein has application to any extremity of an airplane.

The graphical guidance aid technology disclosed herein provides indications (i.e., graphical cues) that are natural and visually aid the pilot in determining clearance to a specific obstacle at a better resolution than they can visually do on their own, and earlier, before a problem develops into a clearance issue. As used herein, the term "graphical cue" means a diagram or symbol overlaid (statically or dynamically) on a video scene to indicate a track, path, boundary or position in space. Static or dynamic graphical overlays are superimposed on a display screen that shows the various views of the cameras. These overlays can help pilots in the following ways: (1) determine the relative position of aircraft extremities; (2) determine the projected path of the extremities; (3) determine stopping distances of all extremities; (4) judge distances from extremities to objects within a specified proximity; (5) inform and alert crew of impending collision threat to extremities; and (6) determine where the extremities will be if a configuration is changed.

One aspect of the graphical guidance aid technology disclosed herein is a system for aiding ground maneuvering of an airplane, the system comprising: a first video camera mounted to an airplane for generating a first stream of video images that include a changing video scene and a fixed image of a first extremity of the airplane; a video display unit on the flight deck of the airplane capable of displaying video images; and a computer system programmed to cause the video display unit to display a video image of the first stream in a first window with a first graphical cue superimposed on the video image of the first stream, the first graphical cue representing projected locations of the first extremity over ground during movement of the airplane. For examples, the first extremity may be a wingtip or a distal end of a wing having a folded wingtip.

In accordance with one embodiment of the system described in the preceding paragraph, the first graphical cue comprises an arc-shaped band and the computer system is programmed to calculate a radius and a sweep angle of the arc-shaped band based on sensor data. The sensor data may comprise airplane groundspeed and nose wheel steering angle.

In accordance with another embodiment, the first graphical cue comprises a projection plane (as used herein, the term "plane" refers to a geometric plane, not an airplane) and the computer system is further programmed to calculate a length of the projection plane based on sensor data. The sensor data may comprise airplane groundspeed. The first graphical cue may further comprise tic marks spaced at intervals along the projection plane. The sensor data may further comprise airplane acceleration/deceleration, in which case the first graphical cue may further comprise a stoppage marker and the computer system may be further programmed to calculate a position of the stoppage marker based on airplane groundspeed and acceleration/deceleration.

The system described above may further comprise a second video camera mounted to an airplane for generating a second stream of video images that include a changing video scene and a fixed image of a second extremity of the airplane, in which case the computer system is further programmed to cause the video display unit to display a video image of the second stream in a second window with a second graphical cue superimposed on the video image of the second stream. In accordance with one embodiment, the first graphical cue comprises a first projection plane, the second graphical cue comprises a second projection plane, and the second projection plane is a mirror image of the first projection plane. In accordance with another embodiment, the first graphical cue comprises a first arc-shaped band having a first radius and the second graphical cue comprises a second arc-shaped band having a second radius greater than the first radius.

Another aspect of the subject matter disclosed in detail below is a method for aiding ground maneuvering of an airplane, the method comprising: capturing a stream of video images that include a changing video scene and a fixed image of an extremity of an airplane; and displaying a video image of the first stream on a video display unit with a graphical cue superimposed on the video image of the stream, the graphical cue representing projected locations of the extremity over ground during movement of the airplane. The extremity may be a wingtip or a distal end of a wing having a folded wingtip. The graphical cue may comprise an arc-shaped band, in which case the method further comprises calculating a radius and a sweep angle of the arc-shaped band based on sensor data, wherein the sensor data comprises airplane groundspeed and nose wheel steering angle. Alternatively, the graphical cue may comprise a projection plane, in which case the method further comprises calculating a length of the projection plane based on sensor data, wherein the sensor data comprises airplane groundspeed. The graphical cue may further comprise tic marks spaced at intervals along the projection plane. In accordance with a further enhancement, the sensor data further comprises airplane acceleration/deceleration and the graphical cue further comprises a stoppage marker, the method further comprising calculating a position of the stoppage marker based on airplane groundspeed and acceleration/deceleration.

A further aspect of the disclosed subject matter is an onboard system for avoiding collisions between a maneuvering airplane and an obstacle, the system comprising: a video camera mounted to an airplane for generating a stream of video images that include a changing video scene and a fixed image of an extremity of the airplane; a video display unit on the flight deck of the airplane capable of displaying video images; and a computer system programmed to perform the following operations: (a) causing the video display unit to display a video image of the stream with a graphical cue superimposed on the video image of the stream, the graphical cue representing projected locations of the extremity over ground during movement of the airplane; (b) processing the video image to determine whether an obstacle appearing in the video image is at a location having less than a minimum separation distance from or intersected by any one of the projected locations or not; and (c) issuing an alert signal if a determination is made in operation (b) that the obstacle location is less than a minimum separation distance from or intersected by a projected location of the extremity.

Yet another aspect is a system for aiding ground maneuvering of an airplane, the system comprising: a video camera mounted to an airplane for generating a stream of video images that include a video scene and an image of an extremity of the airplane; a video display unit on the flight deck of the airplane capable of displaying video images; and a computer system programmed to perform the following operations: (a) calculating projected locations of the extremity over ground during movement of the airplane; (b) transforming the calculated projected locations of the extremity into a graphical cue representing the calculated projected locations of the extremity in a frame of reference of the video scene; and (c) causing the video display unit to display the graphical cue superimposed on the video images in fixed spatial relationship to the image of the extremity. The transforming operation is based at least in part on a known spatial relationship of the camera and the extremity.

A further aspect is a method for aiding ground maneuvering of an airplane, the method comprising: (a) capturing a stream of video images that include a changing video scene and a fixed image of an extremity of an airplane; (b) calculating projected locations of the extremity over ground during movement of the airplane; (c) transforming the calculated projected locations of the extremity into a graphical cue representing the calculated projected locations of the extremity in a frame of reference of the video scene; and (d) displaying a video image of the first stream on a video display unit with a graphical cue superimposed on the video image of the stream, the graphical cue representing projected locations of the extremity over ground during movement of the airplane.

Yet another aspect of the subject matter disclosed herein is an onboard system for avoiding collisions between a maneuvering airplane and an obstacle, the system comprising: a video camera mounted to an airplane for generating a stream of video images that include a changing video scene and a fixed image of an extremity of the airplane; a video display unit on the flight deck of the airplane capable of displaying video images; and a computer system programmed to perform the following operations: (a) calculating projected locations of the extremity over ground during movement of the airplane; (b) transforming the calculated projected locations of the extremity into a graphical cue representing the calculated projected locations of the extremity in a frame of reference of the video scene; (c) causing the video display unit to display the graphical cue superimposed on the video images in fixed spatial relationship to the image of the extremity; (d) processing the video image to determine whether an obstacle appearing in the video image is at a location having less than a minimum separation distance from or intersected by any one of the projected locations or not; and (e) issuing an alert signal if a determination is made in operation (b) that the obstacle location is less than a minimum separation distance from or intersected by a projected location of the extremity.

Other aspects of systems for displaying guidance aids to flight crews for ground obstacle avoidance are disclosed below.

BRIEF DESCRIPTION OF THE DRAWINGS

FIGS. 4 and 5 show additional graphical cues representing the projected locations of the ends of the wings when the wingtips are folded.

Reference will hereinafter be made to the drawings in which similar elements in different drawings bear the same reference numerals.

DETAILED DESCRIPTION

Various embodiments of a system for aiding a pilot during ground maneuvering of an airplane will now be described in detail for purposes of illustration only. These systems are configured and programmed to superimpose graphical collision avoidance cues on images captured by a ground maneuvering camera system, which images appear on a cockpit display. An embodiment in which the ground maneuvering camera system on an airplane has four cameras will now be described with reference to FIG. 1. However, it should be understood that the subject matter claimed hereinafter is not limited to systems having the exact camera layout shown in FIG. 1. Alternative camera layouts capable of providing images of the left and right wingtips can be employed.

Figure 1:
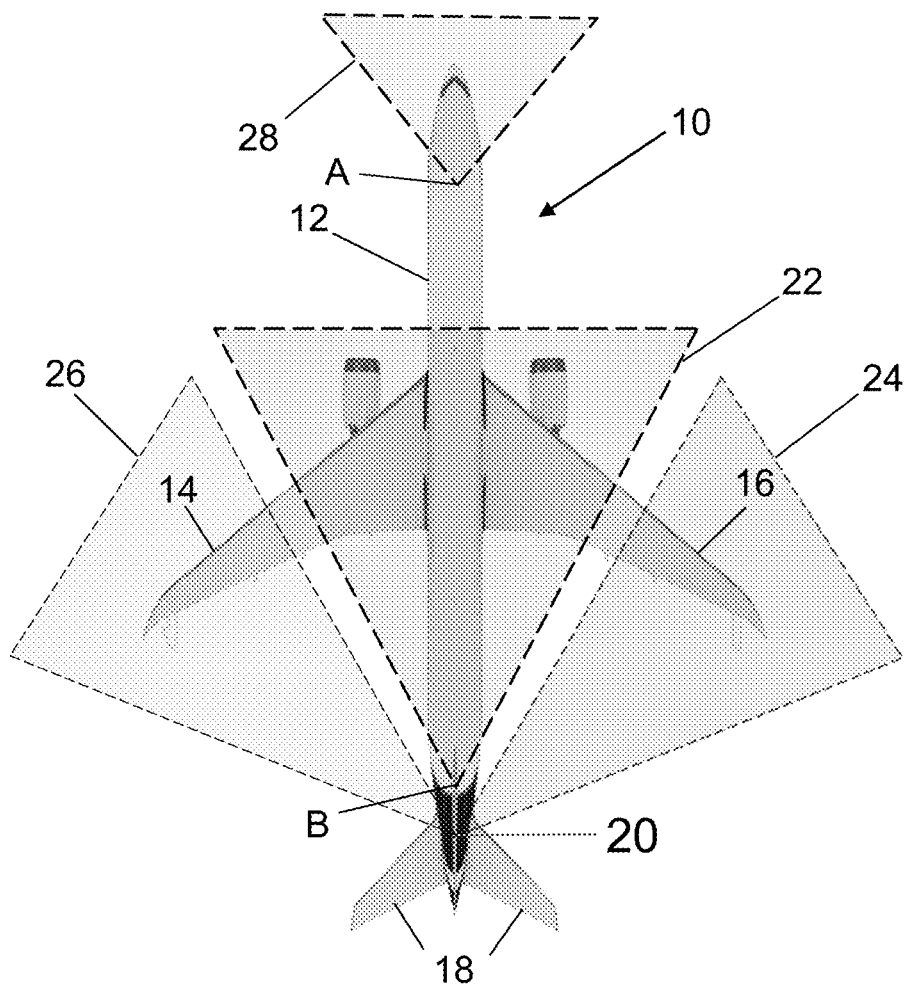
FIG. 1 is a diagram showing a plan view of an airplane having four cameras mounted thereon (i.e., one under the fuselage and three on the empennage section) in accordance with one embodiment. The respective fields of view of the cameras are indicated by dashed triangles.

FIG. 1 is a diagram showing an airplane 10 comprising a fuselage 12, a left wing 14, a right wing 16, a horizontal stabilizer 18 and a vertical stabilizer 20. A plurality of cameras (not shown) of a ground maneuvering camera system (GMCS) are mounted on the aircraft 10. FIG. 1 illustrates a camera layout in which four video cameras (not shown) capture images in their respective fields of view, which images will be concurrently presented on a cockpit display for viewing by the flight crew. The respective fields of view of the four cameras are indicated by dashed triangles in FIG. 1.

The first video camera (not shown in FIG. 1) is mounted to the underside of the fuselage 12 at a position A behind the nose landing gear (not shown) and in front of a line (not shown) that extends between the left and right wing main landing gears (not shown). The field of view 28 of the first video camera is indicated by a dashed triangle in FIG. 1 having a vertex at position A. The first video camera has an orientation pointing forward to provide a view of the nose landing gear and the space ahead of the airplane 10. The view angle of the first video camera encompasses the tires of the nose landing gear and the edges of a runway, taxiway, or apron when they are located within a certain range of the tires of the nose landing gear, as can be seen in the upper panel of the cockpit display screen shot presented in FIG. 2 (discussed in detail below). The images generated by the first video camera allow a pilot to visually judge: a desired amount of oversteer for taxiway turns; gear to pavement edge margin at the end of a runway or turnpad U-turn; and stopping position at a gate nose wheel mark. The exact placement of the first video camera will depend upon airplane structure, and the camera's quality, field of view and level of detail.

The second video camera (not shown) is mounted to the leading edge of the vertical stabilizer 20 of the airplane 10 at a position B located substantially on the centerline of the fuselage 12. The field of view 22 of the second video camera is indicated by a dashed triangle in FIG. 1 having a vertex at position B. Like the first video camera, the second video camera views forward. As a result, the images produced by the second video camera provide prospective (forward looking) guidance. The viewing angle of the second video camera can be adjusted so that the tires of the left and right wing landing gears (not shown in FIG. 1) are simultaneously visible, as can be seen in the middle panel of the cockpit display screen shot presented in FIG. 2. A pilot viewing an image produced by the second video camera can visually judge main landing gear to pavement edge margins as needed in taxiway turns and at the start of runway or turnpad U-turns.

The third and fourth video cameras of the ground maneuvering camera system disclosed herein are respectively mounted on the left and right sides of the vertical stabilizer 20. (Alternatively, they could be located at the leading edges of the left and right portions of the horizontal stabilizer 18.) The fields of view 26 and 24 of the third and fourth video cameras are indicated by respective dashed triangles in FIG. 1, which triangles each have a vertex a short distance aft of position B. The third video camera is focused leftward, forward and downward for viewing of the tip of the left wing 14 (hereinafter "the left wingtip"). The fourth video camera is focused leftward, forward and downward for viewing of the tip of the right wing 16 (hereinafter "the right wingtip").

Various known mountings for these cameras can be employed and are not described in detail herein. As will be readily appreciated by those skilled in camera systems, various types of cameras may be used, for example, low-light or infrared/thermal cameras could be used for night operations. Illumination of the main landing gears, the nose landing gear, and the surrounding ground can be provided by main landing gear area illuminating lights and nose landing gear area illuminating lights (not shown in FIG. 1) mounted on the airplane.

Figure 2:
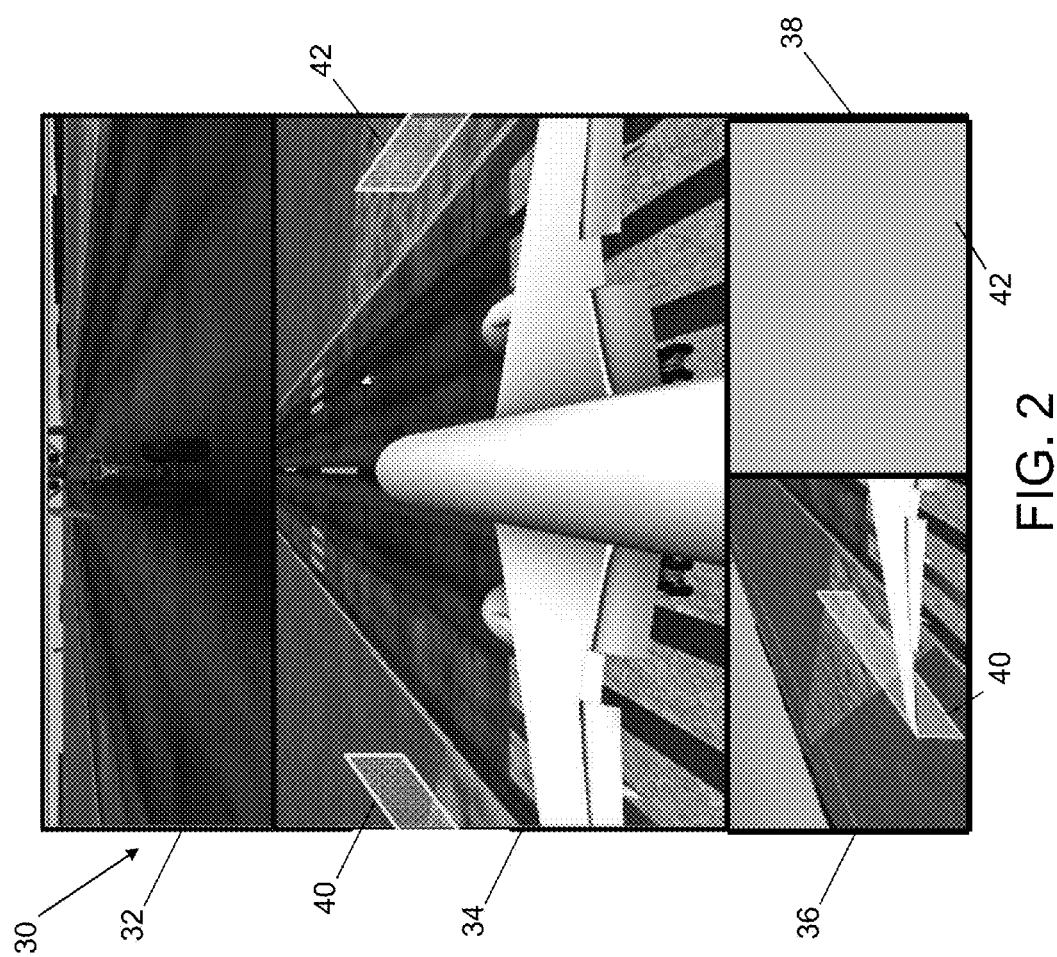
FIGS. 2-6 show screenshots (or portions of screenshots) on a cockpit display in which sample images captured by cameras mounted on an airplane are presented for viewing by a pilot while the airplane is on the ground and moving forward. Graphical cues representing the projected locations of the wingtips over the ground are superimposed on the camera images as the airplane moves forward.

FIG. 2 shows a screenshot on a cockpit display 30 in which sample images captured by the four cameras mounted on an airplane on a runway are presented concurrently for viewing by a pilot while the airplane is moving forward, or whenever selected by the pilot (e.g., when the airplane is standing still or being pushed by a tug). The top window 32 shows an image captured by the video camera mounted at position A in FIG. 1; the middle window 34 shows an image captured by the video camera mounted at position B in FIG. 1; the left bottom window 36 shows an image captured by the video camera mounted on the left side of the vertical stabilizer 20 a short distance aft of position B in FIG. 1; and the right bottom window 38 shows an image captured by the video camera mounted on the right side of the vertical stabilizer 20 a short distance aft of position B in FIG. 1.

The screenshot presented in FIG. 2 further comprises graphical cues representing the projected locations of the wingtips over the ground. These cues take the form of fixed-length projection planes 40 and 42 (shown only partly in the middle window 34) superimposed on the camera images respectively displayed in the middle window 34 (only partly), and in the left and right bottom windows 36 and 38 of the display screen 30. Each of projection planes 40 and 42 projects the location of a respective wingtip to a fixed distance in the forward direction. In FIG. 2, the projection plane 42 is the mirror image of the projection plane 40. The lengths of the projection planes 40, 42 will be equal to each other. The projection planes may be generated by a processor or may be a simple static overlay measured appropriately for height above ground and a certain distance from the wingtip. These projection planes remove perspective issues, help determine where each wingtip is relative to its surrounding environment, and help the pilot judge the distances between the wingtips and relatively close obstacles.

Alternatively, the length of the projection planes can vary dynamically as a function of the groundspeed of the airplane. In this case, each of projection planes 40 and 42 would project the location of a respective wingtip at a time T seconds into the future. The length of the projection planes 40, 42 will be calculated by a computer system based on the instantaneous measured groundspeed of the airplane, assuming that groundspeed will remain constant during the next T seconds. Thus the length of the projection planes in accordance with this alternative embodiment is dynamic in the sense that the depicted length may vary as a function of changing groundspeed. In accordance with a further alternative embodiment, the computer system may also take into account the instantaneous measured acceleration of the airplane in computing the length of the projection planes, thereby projecting the locations of the wingtips at a time T seconds into the future.

Figure 3:
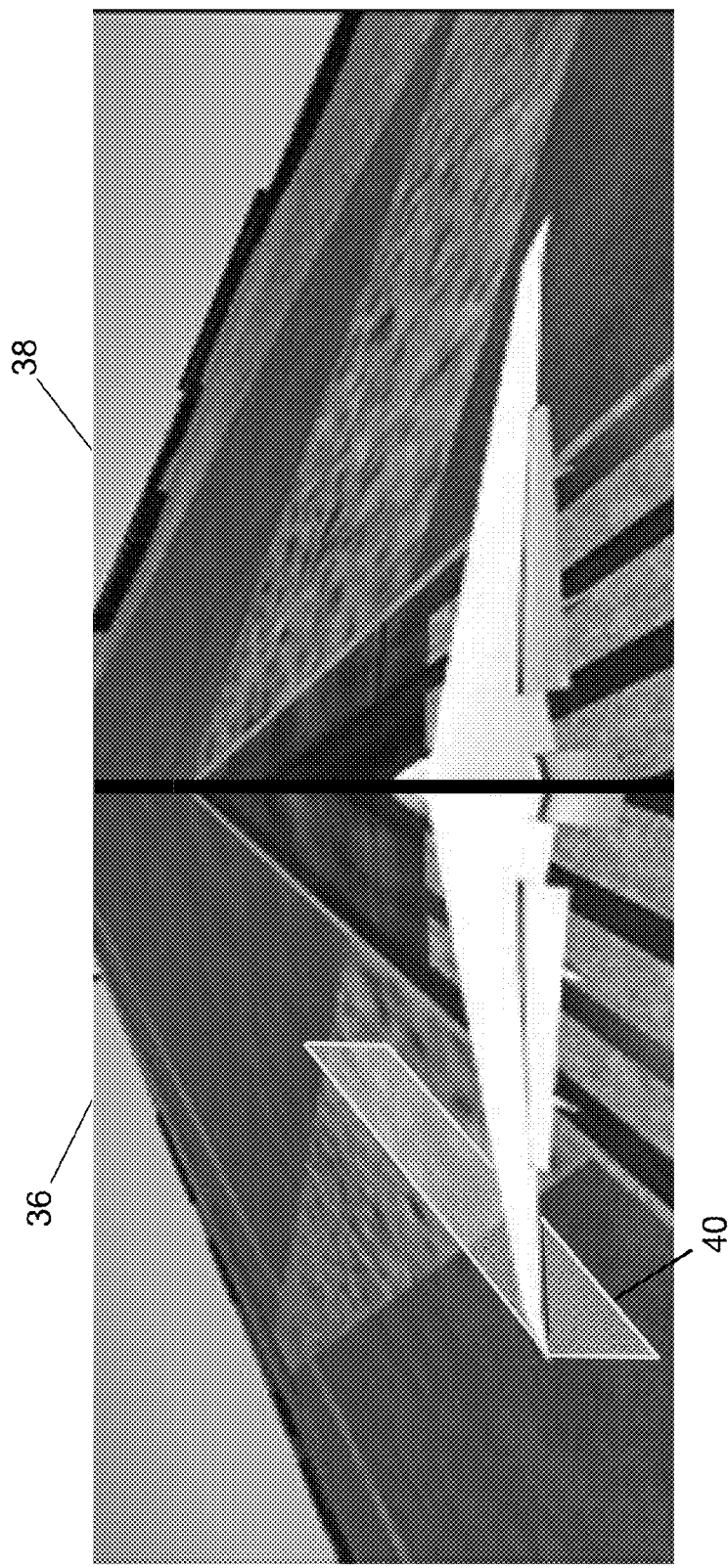

FIG. 3 shows a bottom section of a screenshot having left and right windows providing views of left and right wingtips respectively. A projection plane 40, representing the projected location of the left wingtip over the ground as the airplane moves forward, is superimposed on the image in the left bottom window 36. Similarly, a second projection plane (not shown in FIG. 3), representing the projected location of the right wingtip over the ground can be displayed.

Some airplanes may be designed with folding wingtips hinged to the ends of the fixed wing structure. For airplanes with folding wingtips, the extremities of interest when the wingtips are folded will be the portions of the wings furthest from the fuselage. Optionally, the cockpit display screenshot presented in FIG. 2 could be modified to include graphic graphical cues showing clearance/preview information for the wing extremities when the wingtips are folded and for the wingtips when the wingtips are extended.

More specifically, for folding wingtips an additional projection plane can be displayed on each side of the airplane. One projection plane can show the extended wingtip clearance area in space, while the other projection plane can show the folded wingtip clearance area in space. These can be displayed together or independently depending on the configuration of the wing.

Figure 4:
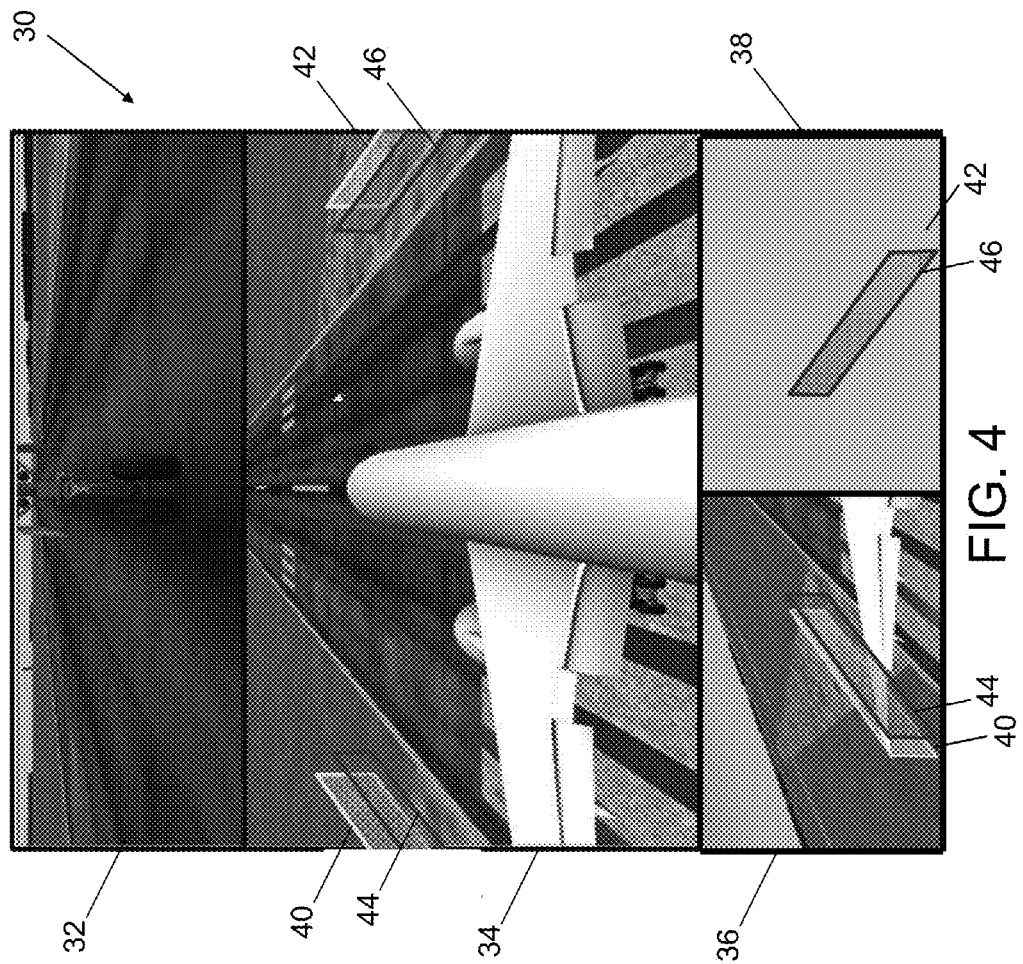

FIG. 4 is another screenshot showing images captured by four cameras mounted on a forward-moving airplane having folding wingtips in accordance with an alternative embodiment. In addition to projection planes 40, 42 representing the projected locations of the folding wingtips over the ground when the wingtips are extended, the images in the middle window 34 and the left/right bottom windows 36, 38 have superimposed projection planes 44, 46 representing the projected locations of the ends of the wings over the ground when the folding wingtips are folded.

Figure 5:
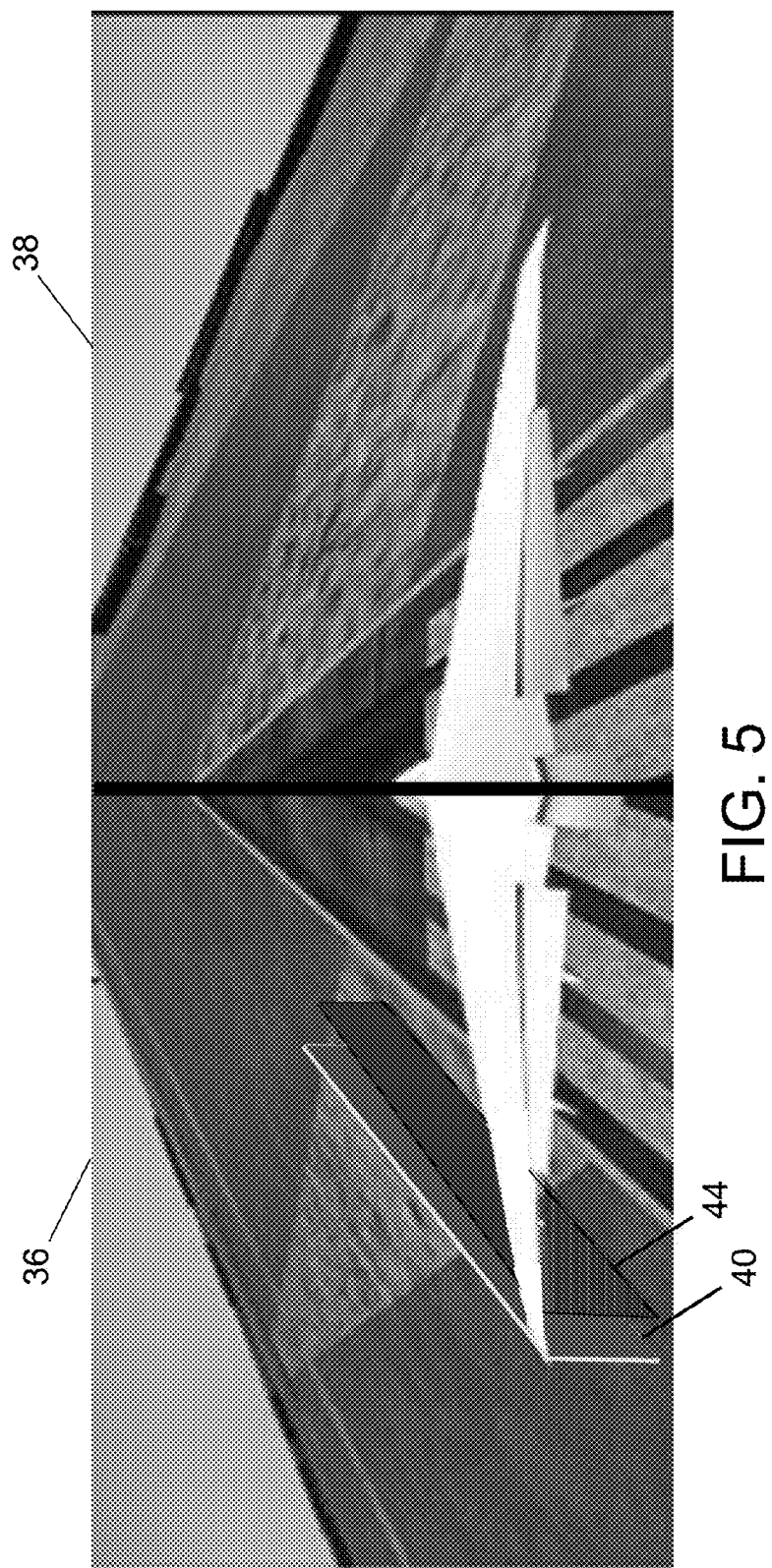

FIG. 5 shows a bottom section of a screenshot having left and right windows 36 and 38 providing views of left and right folding wingtips respectively. A pair of projection planes 40 and 44, respectively representing the projected location of the left folding wingtip over the ground when the left folding wingtip is extended and the projected location of the end of the left wing when the left wingtip is folded, are superimposed on the image in the left window 36 (as seen in FIG. 4). Mirror-image projection planes representing the projected location of the right folding wingtip over the ground when the right folding wingtip is extended and the projected location of the end of the wing over the ground when the right folding wingtip is folded are not shown in the right window 38.

Figure 6:
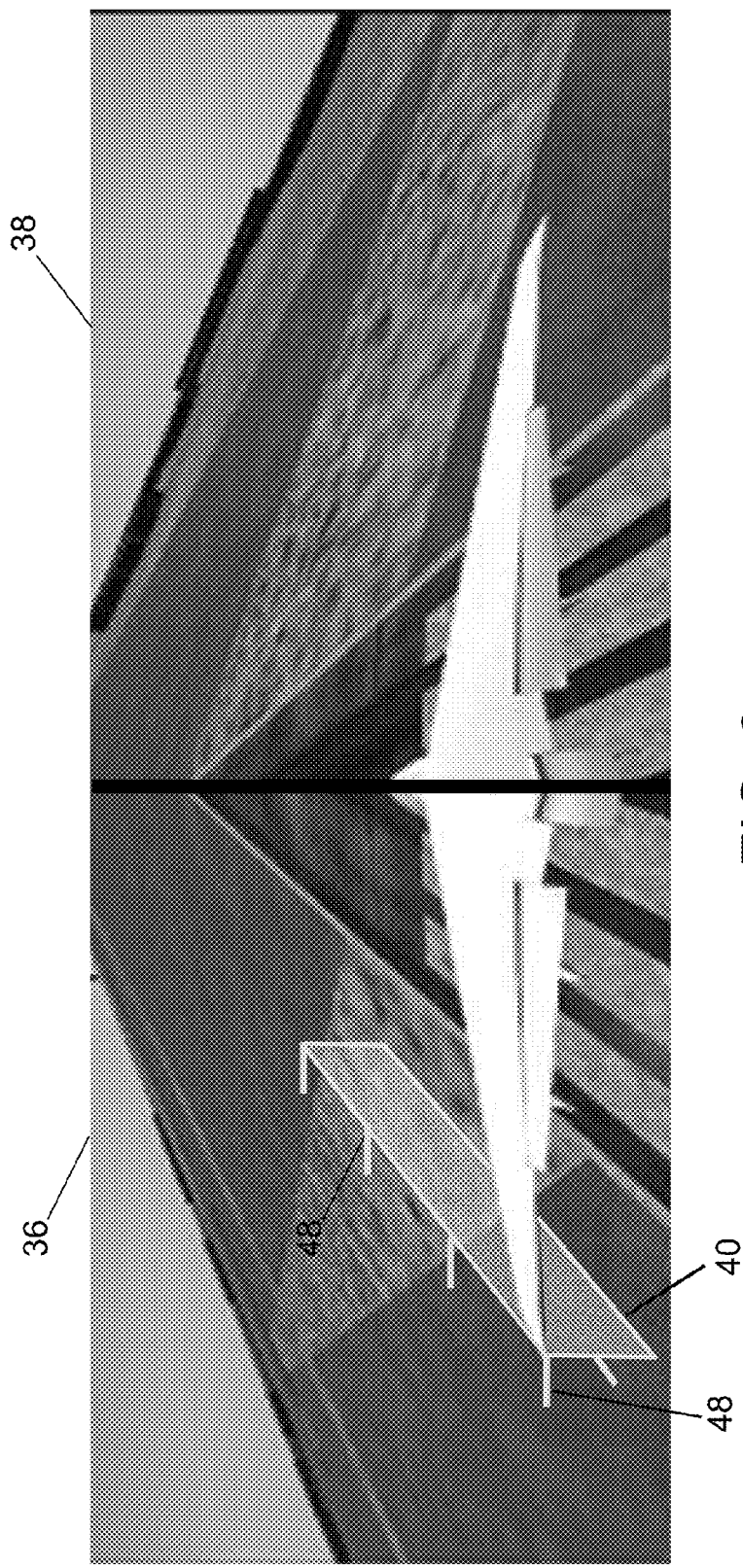

In accordance with a variation of the fixed-length projection planes described above with reference to FIG. 2, tic marks for judging distance can be displayed in conjunction with the graphical cues representing the projected locations of the wingtips. FIG. 6 shows a bottom section of a screenshot having left and right windows 36 and 38 providing views of left and right folding wingtips respectively. A projection plane 40 representing the projected location of the left wingtip over the ground is superimposed on the image in the left window 36. In the implementation seen in FIG. 6, tic marks 48 are displayed at equal intervals along the projection plane 40. The tic marks 48 depict specific increments of length to clearly illustrate total distances to the pilot.

In the implementation depicted in FIG. 6, the tic marks 48 are short horizontal line segments having one end that terminates at an upper boundary of the projection plane 40. These tic marks 48 are spaced apart to give distance information with specific increments of measurement. For example, if the locations of adjacent tic marks 48 correspond to locations separated by a distance of X feet (e.g., X, 2X and 3X feet forward of the current location of the left wingtip), then a pilot would be able to judge where the left wingtip will be located at successive times as the airplane moves forward. The specified distance X can be 10, 50, 100 or any other number of feet (or meters). A mirror-image graphical cue representing the projected locations of the right wingtip over the ground as the airplane moves forward is not shown in the right window 38.

In accordance with some embodiments, the graphical cue may be in the shape of an arc-shaped band, the upper arc-shaped boundary of which has a sweep representing the projected locations of a wingtip as the airplane is turning. These graphical cues can provide information about where the wingtips will be considering the commanded path of the aircraft after a specified amount of time moving at a specified groundspeed. The graphical cue curves in the direction of the turn, by varying degrees, to illustrate the commanded path of the wingtips and more accurately depict where the wingtips will be after a specific amount of time has passed. In accordance with one implementation, the nose wheel steering angle could be used to predict the path of the wingtips during a turn. The arc-shaped band can be generated by a symbol-generating algorithm based on present steering inputs and represents the path the wingtip will follow if the present steering inputs remain unchanged.

Figure 7:
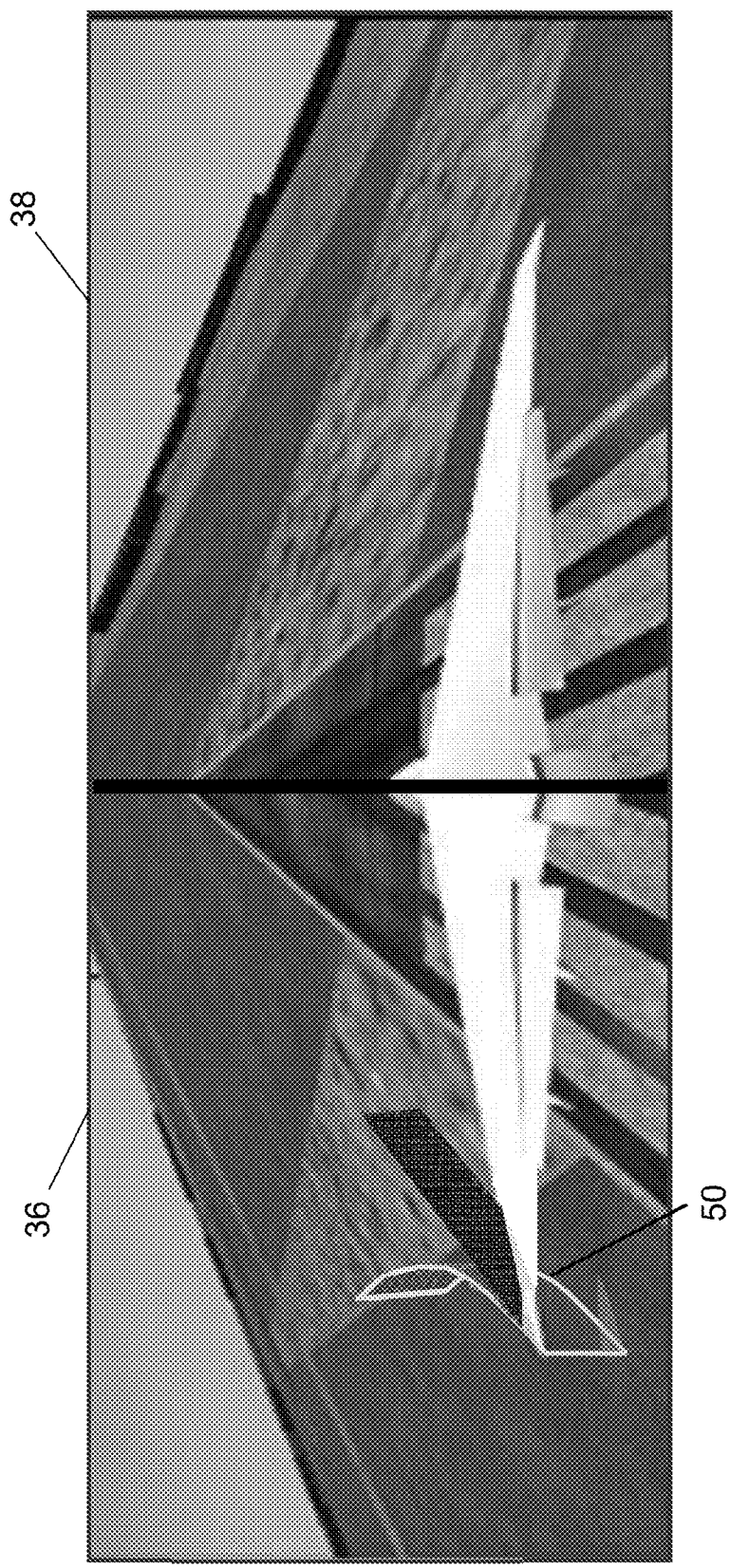
FIG. 7 shows a bottom section of a screenshot similar to that shown in FIG. 3, except instead of a projection plane showing the projected location of left wingtip over the ground when the airplane is moving forward, the images will be displayed with an arc-shaped graphical cue superimposed thereon to represent the projected locations of the wingtips over the ground when the airplane is turning.

One example of an arc-shaped graphical cue representing a projected location of a wingtip on a turning airplane is shown in FIG. 7, which shows a bottom section of a screenshot similar to that shown in FIG. 3. Instead of a straight projection plane showing the projected location of left wingtip over the ground when the airplane is moving forward, the image in the left window 36 has an arc-shaped graphical cue 50 superimposed thereon to represent the projected locations of the left wingtip over the ground when the airplane is turning leftward. A second arc-shaped graphical cue representing the projected location of the right wingtip over the ground as the airplane turns leftward is not shown in the right window 38, but would be an arc of greater length and radius than the arc of the arc-shaped graphical cue 20 seen in the left window 36.

In addition to the above, dynamic-length projection planes can be used to provide real-time information of the stopping distance of the wingtips. In other words, the length of the projection plane indicates the stopping distance of the wingtip at that current speed. This dynamic length feature could be added to both straight projection planes and projection planes that curve to show the path.

Figure 8:
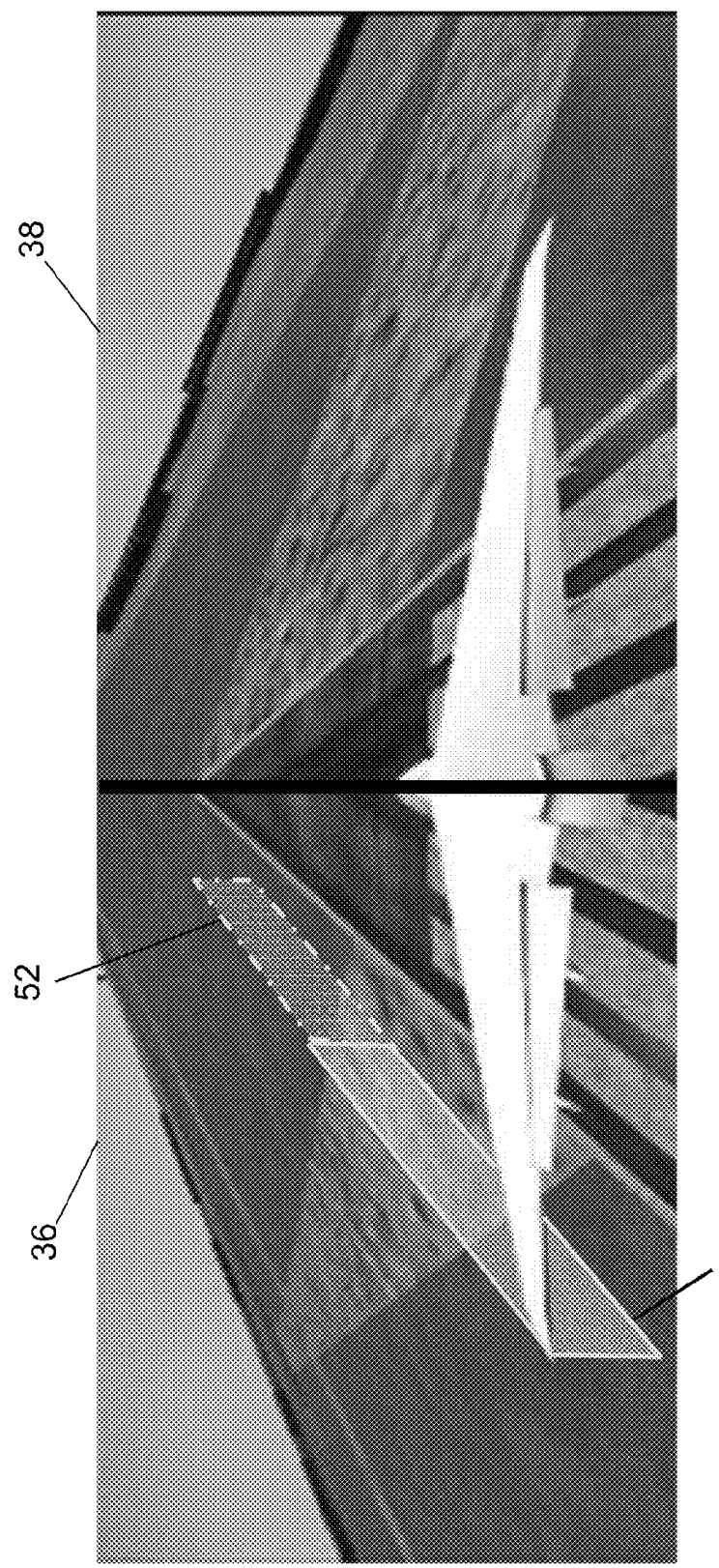
FIGS. 8 and 9 show portions of screenshots similar to that shown in FIG. 3, with additional graphical cues superimposed on the camera image in the left window during braking to indicate where the airplane will stop.

In accordance with a further aspect, FIG. 8 shows portions of a screenshot similar to that shown in FIG. 3, with additional graphical cues superimposed on the camera image in the left window 36 during braking to indicate where the airplane will stop. In FIG. 8 the additional graphical cue takes the form of a forward extension 52 of the projection plane 40. In accordance with this implementation, the location of the front edge of the forward extension 52 can vary as a function of the measured groundspeed and a presumed (or detected) deceleration of the airplane at the time depicted in the image. More specifically, the variable location of the front edge of the forward extension 52 is calculated to represent the projected location of the left wingtip at a time T seconds into the future. The position of the front edge of the forward extension 52 can be calculated by a computer system based on the instantaneous measured groundspeed and deceleration of the airplane, assuming that that deceleration rate will remain constant during the next T seconds.

In accordance with a variation of the implementation depicted in FIG. 8, the computer system could calculate the stopping distance from the airplane position shown in the image, in which case the front edge of the forward extension 52 would represent the projected location of the left wingtip when the airplane has stopped.

Figure 9:
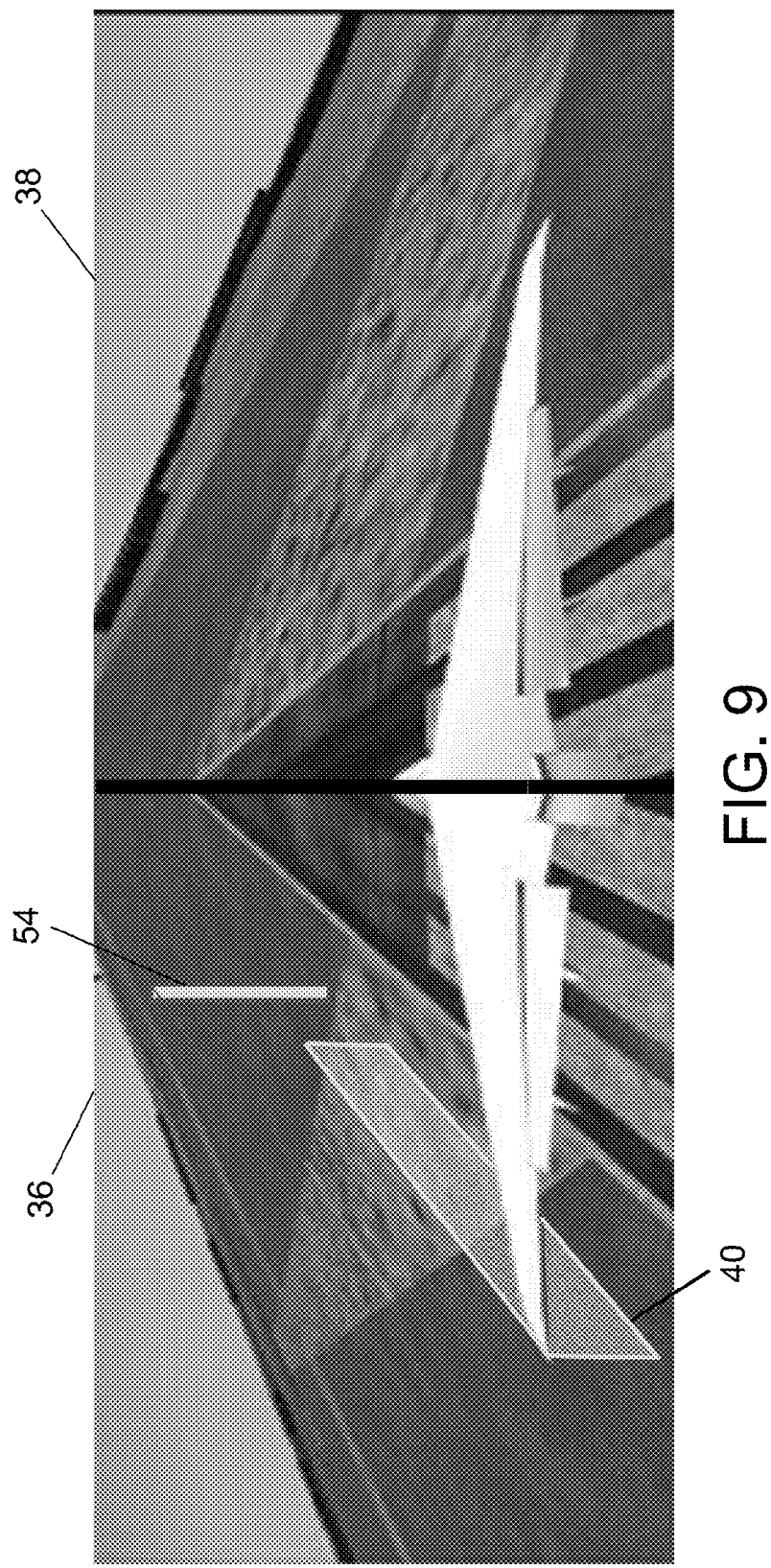

FIG. 9 shows portions of a screenshot similar to that shown in FIG. 3, with alternative additional graphical cues superimposed on the camera image in the left window 36 during braking to indicate where the airplane will stop. In FIG. 9 the additional graphical cue takes the form of a marker 54 representing the projected location of the left wingtip when the airplane has stopped. The marker 54 will be superimposed on the image in the left window 36 at a variable position determined by the computer system, again based on the measured groundspeed and measured deceleration of the airplane at the time depicted in the image.

In accordance with further embodiments, additional graphical cues can be superimposed on the camera images in the screenshot shown in FIG. 2 to provide commanded path information for other airplane components.

Figure 10:
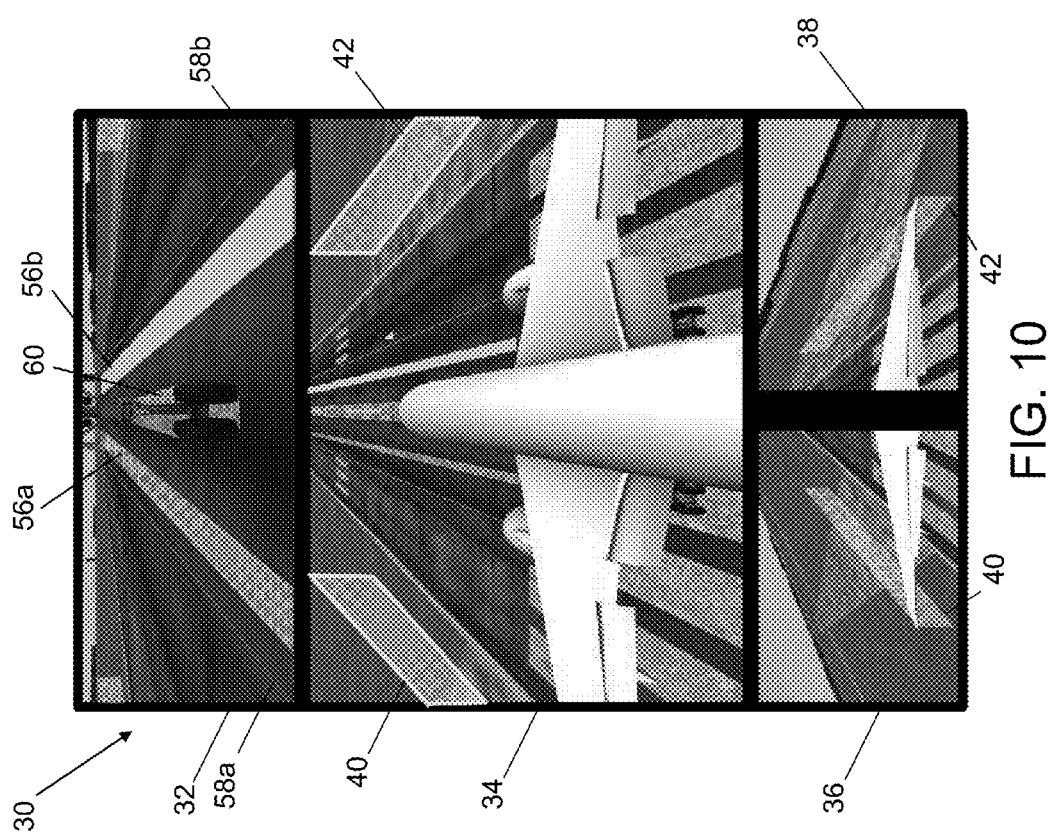
FIG. 10 shows a cockpit display screenshot similar to that shown in FIG. 2, with additional graphical cues superimposed on the camera images to indicate projected tracks of the main landing gear and engine nacelles as the airplane moves forward.

For example, FIG. 10 shows a screenshot 30 similar to that shown in FIG. 2, with additional graphical cues superimposed on the camera images to indicate the commanded paths (i.e., projected tracks) of the main landing gear, the engine nacelles, and the nose wheel as the airplane moves forward. Referring to the top window 34, the additional graphical cues comprise main landing gear tracks 56a and 56b, engine nacelle tracks 58a and 58b, and nose wheel track 60. (The same tracks appear in the middle window 34, but have not been labeled with reference numbers to avoid clutter in the drawing.) These tracks appear as if painted on a flat runway surface. If the aircraft is moving in a straight line, these tracks will be straight; if the aircraft is turning, these tracks will curve to illustrate the commanded path of the turn.

In accordance with a further enhancement, the computer system can be programmed with software that enables the detection of the proximity of obstacles, such as another airplane or a ground vehicle. This provides a means of informing pilots of where the impending collision threat is after an alert has been issued. In some implementations, the projection planes can be used for alerting purposes. If the airplane is fitted with a ground collision avoidance system and a threat to the wingtips (or other airplane component) is detected, the projection plane will change color to indicate which part of the aircraft is being threatened. For example, if a potential left wingtip collision is detected, the projection plane associated with the left wingtip would change color, e.g., from magenta, cyan, or white to amber or red.

Figure 11:
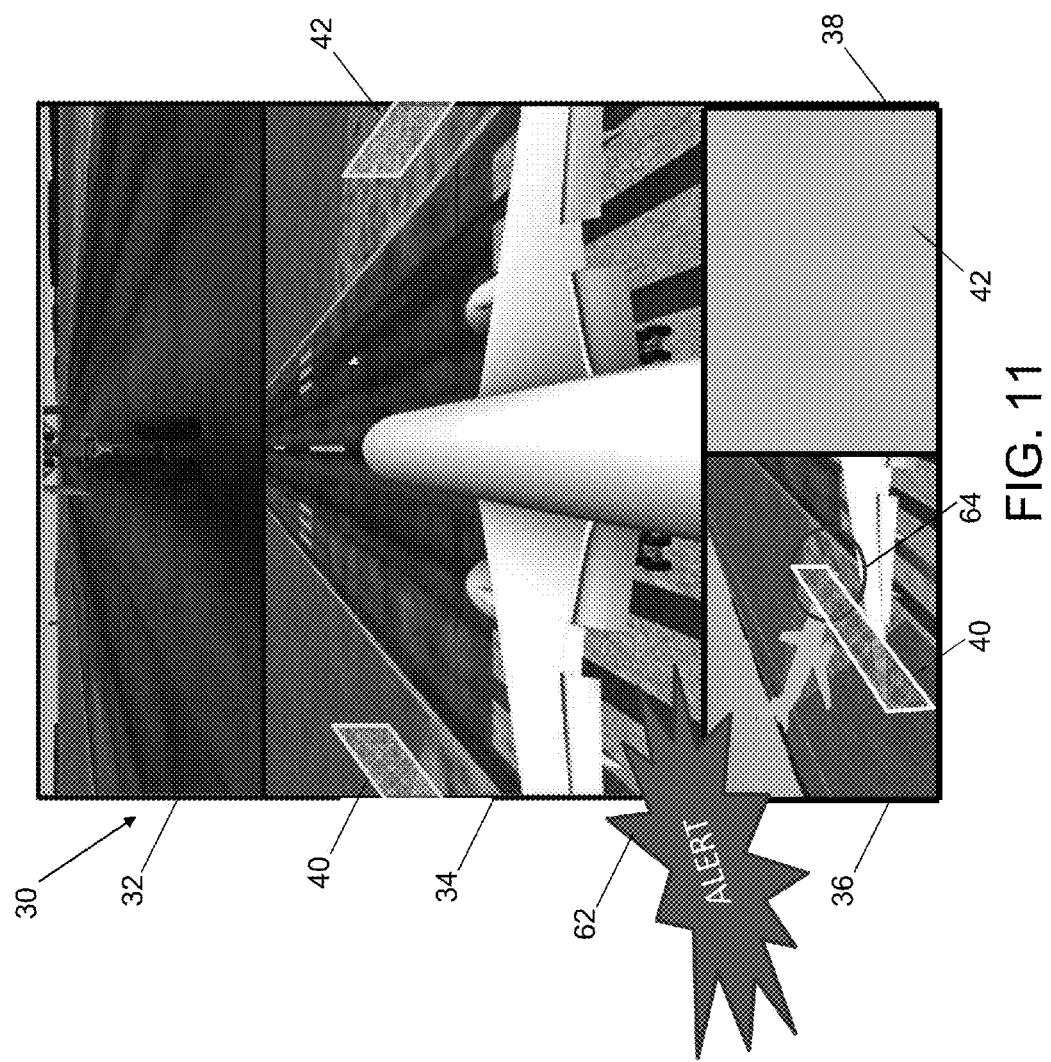
FIG. 11 shows a screenshot similar to that shown in FIG. 2, except that another aircraft is in the field of view of the camera mounted on the left side of the vertical stabilizer, which other aircraft is located sufficiently close to the projection plane indicating the projected location of the left wingtip of ownship as the latter moves forward that a visual alert is activated, for example, by highlighting or changing the color of the projection plane.

One example of such an obstacle proximity system will now be described with reference to FIG. 11 which shows a screenshot similar to that shown in FIG. 2, except that another aircraft is in the field of view of the camera mounted on the left side of the vertical stabilizer of ownship. The proximity of the superimposed projection plane 40 to the image of the encroaching airplane in the circled area 64 can provide a visual indication to the pilot of a possible collision. In accordance with a further enhancement, the computer system can be programmed to use pattern recognition software to detect the presence of another aircraft in the field of view of a camera and then calculate the location of that portion of the other aircraft which is closest to ownship. The computer system could be further programmed to compare the location of the other aircraft to the projected locations of the left wingtip represented by the projection plane 40 and then, if the former is separated from the latter by a distance less than a specified threshold, activate an audible or visible alert signal. For example, a visible alert signal could be generated by highlighting or changing the color of the projection plane 40. By determining the location of the other aircraft for successive images captured by the video camera, the computer system could even determine whether the other aircraft is moving closer to ownship or not and, if the other aircraft is moving, calculate its groundspeed and heading, and then take those factors into account when performing the algorithm used to determine whether an alert should be issued or not.

In accordance with a further enhancement, the computer system could be programmed to process the video image to determine whether an obstacle appearing in the video image is at a location intersected by any one of the projected locations or not; and then issue a further alert signal if a determination is made that the obstacle location is intersected by a projected location of the extremity.

Figure 12:
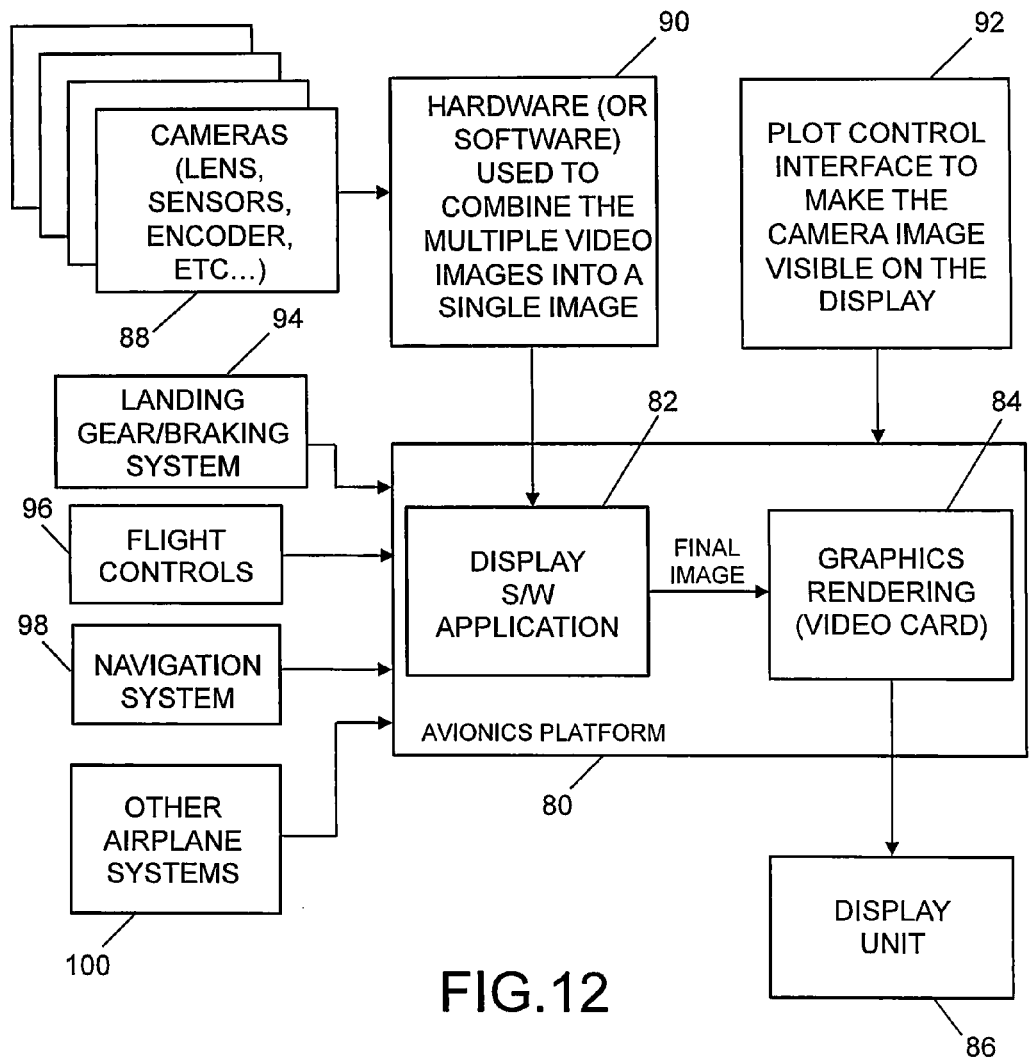
FIG. 12 is a block diagram showing some components of one embodiment of a system incorporating the graphical cue technology disclosed herein.

FIG. 12 is a block diagram showing some components of one embodiment of a system incorporating the graphical cue technology disclosed above. Although all of the individual computers and processors incorporated in this system are not represented separately in FIG. 12, it should be understood that every block shown in FIG. 12 may comprise a computer or a processor or two or more computers and/or processors. All of these computers and processors, when interconnected by buses and networks, form one embodiment of a "computer system", which term is defined in the penultimate paragraph of this section entitled Detailed Description. A computer system for performing the functions disclosed herein may have many different configurations other than the configuration partly represented by the block diagram seen in FIG. 12.

The system partly and schematically depicted in FIG. 12 comprises a plurality of video cameras 88 mounted on the airplane. Each video camera may comprise a lens assembly, an image sensor, an encoder, etc. The multiple streams of images captured by video cameras 88 are sent to an image combiner 90, which combines the multiple streams of images into a single stream of images for display on a cockpit display unit 86. The image combiner 90 may be implemented as hardware or software. The single stream of combined images is sent to a display software application 82 that runs on an avionics platform 80 comprising a computer, buses, memory, processors, etc. The display software application 82, which runs on the computer of the avionics platform 82, produces a stream of final images in which the graphical cues disclosed herein are superimposed on the original video images output by the image combiner 90. The avionics platform 80 further comprises means 84 (such as a video card) for graphics rendering of each final image. The graphics rendering means 84 convert the final images into video signals for display by the display unit 86. The system shown in FIG. 12 further comprises a pilot control interface 92 (e.g., a button, knob, software selection using virtual buttons, etc.) to activate display of the stream of final images on the display unit 86.

The term "avionics platform", as used herein, refers to a computer system that may take many different forms. For example, the avionics platform may comprise a computer that runs the main flight avionics of the airplane (driving all the main flight deck displays) or a computing/operating system that runs on an electronic flight bag/tablet. Alternatively, the hardware or software that combines the multiple streams of video images together may be resident in the avionics platform 80.

The display software application 82 comprises a cue generator module that computes the shape, position, movement, size, etc. of all graphical cues to be superimposed on each frame of the video to be displayed on the display unit 86. These computations are based on the data collected by various sensors or other data collection systems incorporated in various airplane systems, such as a landing gear/braking system 94, a flight control system 96, a navigation system 98, or other airplane system 100, all of which are in communication with the avionics platform 80. For example, the navigation system 98 may be of a type that uses a computer, motion sensors (e.g., accelerometers) and rotation sensors (e.g., gyroscopes) to continuously calculate via dead reckoning the position, orientation, velocity (direction and groundspeed), and acceleration of an airplane. In addition, the landing gear/braking system 94 may be of a type that uses a processor and sensors to continuously calculate the nose wheel steering angle.

In accordance with various embodiments, the display software application 82 may comprise respective software modules for performing one or more of the following algorithms:

(1) an algorithm for displaying a fixed-length projection plane representing the projected location of a component (e.g., an extended or folded wingtip) of a forward-moving airplane;

(2) an algorithm for calculating the length of a projection plane based on groundspeed data and acceleration/deceleration data from the navigation system and then displaying a dynamic-length projection plane (with or without tic marks) having the calculated length and representing the projected locations of a component (e.g., an extended or folded wingtip) of a forward-moving airplane;

(3) an algorithm for calculating the position of a stoppage marker based on groundspeed data and acceleration/deceleration data from the navigation system and then displaying a stoppage marker having the calculated position and representing the projected location of a component (e.g., an extended or folded wingtip) when a forward-moving airplane has come to a stop;

(4) an algorithm for calculating the radius and sweep of an arc-shaped band based on groundspeed data from the navigation system and nose wheel steering angle data from the landing gear/braking system and then displaying an arc-shaped band having the computed radius and sweep and representing the projected locations of a component (e.g., an extended or folded wingtip) of a turning airplane;

(5) an algorithm for displaying a projected track of an on-ground component (e.g., a main landing gear or a nose wheel) of an airplane that is moving forward or turning; and (6) an algorithm for displaying a projected track of a centerline of an above-ground component (e.g., an engine nacelle) of an airplane that is moving forward or turning.

All of the foregoing computations rely on the known fixed location (position and orientation) of the aircraft component whose location or track is being displayed relative to the location (position and orientation) of the video camera that captured the image on which the graphical cues will be superimposed.

In accordance with one implementation, a system for aiding ground maneuvering of an airplane comprises: a video camera mounted to an airplane for generating a stream of video images that include a video scene and an image of an extremity of the airplane; a video display unit on the flight deck of the airplane capable of displaying video images; and a computer system programmed to perform the following operations: (a) calculating projected locations of the extremity over ground during movement of the airplane; (b) transforming the calculated projected locations of the extremity into a graphical cue representing the calculated projected locations of the extremity in a frame of reference of the video scene; and (c) causing the video display unit to display the graphical cue superimposed on the video images in fixed spatial relationship to the image of the extremity. The transforming operation is based at least in part on a known spatial relationship of the camera and the extremity.

In accordance with a further aspect, the display software application 82 may further comprise pattern recognition software capable of recognizing another airplane, a ground vehicle or any other obstacle that poses a threat in a video image and a software module for calculating a minimum separation distance between any recognized aircraft, ground vehicle, or other obstacle and a projection plane of an extremity of ownship. This process occurs in real-time. The display software application 82 also generates an alert signal that activates the display of a visible alert on the display unit 86 (or the annunciation of an audible warning) based on the analysis of the camera-generated images.

While systems for displaying graphic collision avoidance cues have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The claims set forth hereinafter should not be construed to require that the steps or operations recited therein be performed in alphabetical order or in the order in which they are recited. Nor should they be construed to exclude any portions of two or more steps being performed concurrently or alternatingly.

The invention claimed is:

1. A system for aiding ground maneuvering of an airplane, said system comprising:
   a first video camera mounted to an airplane for generating a first stream of video images that include a changing video scene and a fixed image of a first extremity of said airplane;
   a video display unit on the flight deck of said airplane capable of displaying video images; and
   a computer system programmed to cause said video display unit to display a video image of said first stream in a first window with a first graphical cue superimposed on said video image of said first stream, said first graphical cue representing projected locations of said first extremity over ground during movement of said airplane.

2. The system as recited in claim 1, wherein said first extremity is a wingtip.

3. The system as recited in claim 1, wherein said first extremity is a distal end of a wing having a folded wingtip.

4. The system as recited in claim 1, wherein said first graphical cue comprises an arc-shaped band and said computer system is programmed to calculate a radius and a sweep angle of said arc-shaped band based on sensor data.

5. The system as recited in claim 4, wherein said sensor data comprises airplane groundspeed and nose wheel steering angle.

6. The system as recited in claim 1, wherein said first graphical cue comprises a projection plane and said computer system is further programmed to calculate a length of said projection plane based on sensor data.

7. The system as recited in claim 6, wherein said sensor data comprises airplane groundspeed.

8. The system as recited in claim 7, wherein said first graphical cue further comprises tic marks spaced at intervals along said projection plane.

9. The system as recited in claim 7, wherein said sensor data further comprises airplane acceleration/deceleration.

10. The system as recited in claim 9, wherein said first graphical cue further comprises a stoppage marker and said computer system is further programmed to calculate a position of said stoppage marker based on airplane groundspeed and acceleration/deceleration.

11. The system as recited in claim 1, further comprising a second video camera mounted to an airplane for generating a second stream of video images that include a changing video scene and a fixed image of a second extremity of said airplane, wherein said computer system is further programmed to cause said video display unit to display a video image of said second stream in a second window with a second graphical cue superimposed on said video image of said second stream.

12. The system as recited in claim 11, wherein said first graphical cue comprises a first projection plane, said second graphical cue comprises a second projection plane, and said second projection plane is a mirror image of said first projection plane.

13. The system as recited in claim 11, wherein said first graphical cue comprises a first arc-shaped band having a first radius and said second graphical cue comprises a second arc-shaped band having a second radius greater than said first radius.

14. A method for aiding ground maneuvering of an airplane, said method comprising:
   capturing a stream of video images that include a changing video scene and a fixed image of an extremity of an airplane; and
   displaying a video image of said first stream on a video display unit with a graphical cue superimposed on said video image of said stream, said graphical cue representing projected locations of said extremity over ground during movement of said airplane.

15. The method as recited in claim 14, wherein said extremity is a wingtip or a distal end of a wing having a folded wingtip.

16. The method as recited in claim 14, wherein said graphical cue comprises an arc-shaped band, further comprising calculating a radius and a sweep angle of said arc-shaped band based on sensor data, wherein said sensor data comprises airplane groundspeed and nose wheel steering angle.

17. The method as recited in claim 14, wherein said graphical cue comprises a projection plane, further comprising calculating a length of said projection plane based on sensor data, wherein said sensor data comprises airplane groundspeed.

18. The method as recited in claim 17, wherein said graphical cue further comprises tic marks spaced at intervals along said projection plane.

19. The method as recited in claim 17, wherein said sensor data further comprises airplane acceleration/deceleration and said graphical cue further comprises a stoppage marker, said method further comprising calculating a position of said stoppage marker based on airplane groundspeed and acceleration/deceleration.

20. An onboard system for avoiding collisions between a maneuvering airplane and an obstacle, said system comprising:
   a video camera mounted to an airplane for generating a stream of video images that include a changing video scene and a fixed image of an extremity of said airplane;
   a video display unit on the flight deck of said airplane capable of displaying video images; and
   a computer system programmed to perform the following operations:
   (a) causing said video display unit to display a video image of said stream with a graphical cue superimposed on said video image of said stream, said graphical cue representing projected locations of said extremity over ground during movement of said airplane;
(b) processing said video image to determine whether an obstacle appearing in said video image is at a location having less than a minimum separation distance from or intersected by any one of said projected locations or not; and
(c) issuing an alert signal if a determination is made in operation (b) that the obstacle location is less than a minimum separation distance from or intersected by a projected location of said extremity.

21. A system for aiding ground maneuvering of an airplane, said system comprising:
a video camera mounted to an airplane for generating a stream of video images that include a video scene and an image of an extremity of said airplane;
a video display unit on the flight deck of said airplane capable of displaying video images; and
a computer system programmed to perform the following operations:
(a) calculating projected locations of said extremity over ground during movement of said airplane;
(b) transforming said calculated projected locations of said extremity into a graphical cue representing said calculated projected locations of said extremity in a frame of reference of said video scene; and
(c) causing said video display unit to display said graphical cue superimposed on said video images in fixed spatial relationship to said image of said extremity.

22. The system as recited in claim 21, wherein said transforming operation is based at least in part on a known spatial relationship of said camera and said extremity.

23. A method for aiding ground maneuvering of an airplane, said method comprising:
(a) capturing a stream of video images that include a changing video scene and a fixed image of an extremity of an airplane;
(b) calculating projected locations of the extremity over ground during movement of the airplane;
(c) transforming said calculated projected locations of the extremity into a graphical cue representing said calculated projected locations of the extremity in a frame of reference of said video scene; and
(d) displaying a video image of said first stream on a video display unit with a graphical cue superimposed on said video image of said stream, said graphical cue representing projected locations of said extremity over ground during movement of said airplane,
wherein steps (b) and (c) are performed by a computer system.

24. An onboard system for avoiding collisions between a maneuvering airplane and an obstacle, said system comprising:
a video camera mounted to an airplane for generating a stream of video images that include a changing video scene and a fixed image of an extremity of said airplane;
a video display unit on the flight deck of said airplane capable of displaying video images; and
a computer system programmed to perform the following operations:
(a) calculating projected locations of said extremity over ground during movement of said airplane;
(b) transforming said calculated projected locations of said extremity into a graphical cue representing said calculated projected locations of said extremity in a frame of reference of said video scene;
(c) causing said video display unit to display said graphical cue superimposed on said video images in fixed spatial relationship to said image of said extremity;
(d) processing said video image to determine whether an obstacle appearing in said video image is at a location having less than a minimum separation distance from or intersected by any one of said projected locations or not; and
(e) issuing an alert signal if a determination is made in operation (b) that the obstacle location is less than a minimum separation distance from or intersected by a projected location of said extremity.

\* \* \* \* \*